United States Patent Office 2,841,464
Patented July 1, 1958

2,841,464
PRECIPITATION METHOD OF SEPARATION OF NEPTUNIUM

Lawrence B. Magnusson, Richmond, Calif., assignor to the United States of America as represented by the United States Atomic Energy Commission No Drawing. Application February 2, 1948
Serial No. 5,890

3 Claims. (Cl. 23—14.5)

This invention relates to a method of separating neptunium from plutonium.

Plutonium exists in at least four valent states, plus three, plus four, plus five and plus six. Neptunium exists in at least three of these valent states, plus four, plus five and plus six. The behavior of these two elements in the presence of various anions with or without a carrier cation depends upon the valent state of the elements and upon the solubility of the carrier formed. Thus fluorine ions form insoluble fluorides of the two elements in a valent state not greater than plus four. Also when these elements are in the plus six state of oxidation they form insoluble complex acetates with alkali metals, and they are carried from solution as sodium neptunyl acetate and sodium plutonyl acetate especially when sodium uranyl acetate is present as a carrier.

A process for the differential oxidation of neptunium ions in the presence of plutonium ions and sulphate ions is disclosed in copending application, Serial Number 637,485, filed December 27, 1945. According to this invention, neptunium may be oxidized to a valent state greater than plus four without oxidizing plutonium by contacting an aqueous solution containing these elements in a valent state not greater than plus four with an alkali metal bromate. From such a treated solution, plutonium may be removed by adding lanthanum ions and fluoride ions and separating the lanthanum fluoride precipitate thus formed. This process requires one to two hours for the oxidation step which is carried out at room temperature.

The instant invention is an improvement over the invention just outlined, particularly in the speed of the process.

In accordance with this invention neptunium is separated from an aqueous solution containing neptunium, plutonium, and sulphate ions by contacting said solution with hypochlorite ions at room temperature, adding lanthanum ions and fluoride ions thus precipitating lanthanum fluoride and plutonium fluoride, and then separating the resulting precipitate and the supernatant solution.

The operation of this invention is illustrated by the following examples.

EXAMPLE I

A stock solution was prepared containing the following ingredients: NaClO, $H_2SO_4$ and $La^{+3}$ ions. Tracer neptunium and plutonium solution was prepared in acid solution and the valent states of these two elements were reduced to a state not greater than plus four by contacting the solution with sulphur dioxide. The tracer solution containing neptunium and plutonium was then mixed with the stock solution and at the end of various time intervals (as shown by Table I) 1 milliliter aliquots of the mixed solution were withdrawn. The 1-milliliter aliquots contained the following concentrations of ingredients: 0.15 M NaClO, 0.5 M $H_2SO_4$, 0.2 mg. $La^{+3}$/ml., 2370 α counts/min. of $Pu^{239}$ per ml. and 1330 β counts/min. of $Np^{239}$ per ml. A lanthanum fluoride carrier was precipitated by making the aliquots 1 M in HF. The lanthanum fluoride precipitate was separated by centrifuging and washed once with 0.2 milliliter of water. The separated and washed precipitates were then mounted on platinum foils and the neptunium and plutonium were determined by usual radiochemical techniques. Since neptunium is a beta emitter and plutonium is an alpha emitter, the quantities of these two elements present are readily estimated. This determination depends upon the fact that reduced neptunium and plutonium are carried by a lanthanum fluoride carrier precipitate, but oxidized neptunium and plutonium are not carried by a lanthanum fluoride carrier. Therefore the amount of each species oxidized was readily found by determining the number of α counts of plutonium carried with the precipitate and the number of β counts of neptunium carried with the precipitate, since the percentage of each species which was oxidized was inversely proportional to the percentage of the total counts per minute of the species present in the precipitate. This is shown in the column entitled "Not Oxidized by ClO⁻" in Table I. The combined supernatant solution and wash was then treated with sulphur dioxide to reduce any oxidized neptunium and plutonium present to a valent state not greater than plus four. After about a one hour reduction time about 0.2 milliliter of solution containing 0.4 milligram of lanthanum ions was added in three portions to precipitate lanthanum fluoride, which was separated and mounted on platinum foils and assayed by regular radiochemical techniques, thus giving a determination of the amounts of plutonium and neptunium which had been oxidized by the ClO⁻ ion, and subsequently reduced and precipitated. These results are summarized in the column entitled "Oxidized by ClO⁻" in Table I. This table shows that 74 percent of the neptunium had been oxidized by the hypochlorite in 15 minutes, that 91 percent had been oxidized in 30 minutes, and that 97 percent had been oxidized in one hour, contrasting to one percent or less of the plutonium oxidized in the same length of time.

Table 1

| Oxidation Time (Minutes) | Oxidized by ClO⁻ | | Not Oxidized by ClO⁻ | |
|---|---|---|---|---|
| | Percent Pu | Percent Np | Percent Pu | Percent Np |
| 5 | 2 | 24 | 96 | 84 |
| 15 | 1 | 74 | 98 | 32 |
| 30 | 0.6 | 91 | 97 | 3 |
| 60 | 0.9 | 97 | 100 | 2 |
| 1,080 | 6 | 95 | 92 | 0.1 |
| 1,080 | 6 | 95 | 90 | 0.2 |

EXAMPLE II

Hypochlorous ions will also differentially oxidize neptunium in the presence of macro quantities of plutonium. Thus a lanthanum fluoride precipitate containing 9850 milligrams of plutonium and tracer quantities of neptunium was metathesized by slurrying with 10 liters of an aqueous solution containing 15 percent KOH and 10 percent $K_2CO_3$ at 75° C. for four hours. The metathesized lanthanum composition was dissolved in 10 N $HNO_3$. This solution was contacted with 3 liters of hydrogen peroxide solution that was about 1.5 N in $HNO_3$ and 0.1 N in $H_2SO_4$, thus precipitating the plutonium as $PuO_4$ which carried the neptunium. The precipitate was dissolved in sulphuric acid and adjusted to a concentration of 1 N in $H_2SO_4$. To this solution there was added 1 liter of 0.15 M NaOCl solution and the mixture was allowed to stand 8 hours. The oxidized solution was then made 0.2 M in KF and 0.5 M in HF. Potassium plutonous fluoride was precipitated, leaving the neptunium in solution. The supernatant solution containing the neptunium was treated with sulphur dioxide to reduce the neptunium and then lanthanum ions were added to a concentration of 100 milligrams per liter. The lanthanum fluoride precipitate carrying the neptunium was separated and assayed for neptunium by the usual radiochemical techniques. The results are summarized in Table II.

The data in Table II show that 90 percent of the neptunium present in the original lanthanum fluoride material remained in the supernatant solution from the potassium plutonous fluoride precipitation. About 5 percent of the neptunium remained in the peroxide supernatant solution and the remainder had been lost in the metathesis steps or in other parts of the process.

Table II

| Process Step | Plutonium, milligrams | Neptunium, percent of original |
| --- | --- | --- |
| Original LaF$_3$ Slurry | 9,850 | 100 |
| Peroxide Precipitate | 9,750 |  |
| Peroxide Supernatant | 120 | 5 |
| K$_2$PuF$_6$ Supernatant | 3.7 | 90 |

The final recovery of the plutonium after further treatment to yield a solution of the nitrate of this metal was 9770 milligrams. In this example, 90 percent of the neptunium had been oxidized by hypochlorite ions so that it was separable from the plutonium present.

The neptunium in such solutions from which plutonium has been removed may be recovered by further treatment such as that shown in Example I. The solution may also be subjected to further oxidation and treatment and the neptunium removed by addition of sodium ions and acetate ions thus carrying the neptunium down as the insoluble sodium neptunyl acetate.

What is claimed is:

1. A process for the separation of neptunium from plutonium in an aqueous solution containing neptunium ions in a valence state not greater than +4, plutonium ions in a valence state not greater than +4 and sulphate ions, comprising adding hypochlorite ions to said solution and then digesting the solution at a temperature of 15° to 25° C., adding lanthanum ions and fluorine ions, and thereafter separating the supernatant solution from the precipitate.

2. The process of claim 1 in which lanthanum nitrate is the source of the lanthanum ions and hydrofluoric acid is the source of fluorine ions.

3. A process for the separation of neptunium from plutonium in an aqueous solution containing neptunium ions in a valence state not greater than +4, plutonium ions in a valence state not greater than +4 and sulphate ions, comprising adding hypochlorite ions to said solution and then digesting the solution at 15° to 25° C., adding potassium fluoride and hydrofluoric acid, and thereafter removing the potassium plutonous fluoride precipitate thus formed.

References Cited in the file of this patent

Deming: General Chemistry, 5th ed., page 275 (1944); publ. by John Wiley & Sons, New York.

Seaborg: "Plutonium and Other Transuranium Elements," Atomic Energy Commission declassified document MDDC 505, Nov. 19, 1946, page 5.

Seaborg et al.: "The Chemical Properties of Elements 94 and 93," Journal of the American Chemical Society, vol. 70, page 1133 (March 1948; report submitted March 21, 1942).